United States Patent Office 3,478,010
Patented Nov. 11, 1969

3,478,010
AZO DYESTUFFS OF THE ACRIDONE SERIES
Hermann Hoffmann and Heidi Zeitler, East Greenwich,
R.I., assignors, by mesne assignments, to Farbwerke
Hoechst AG, vormals Meister Lucius & Bruning,
Frankfurt am Main, Germany
No Drawing. Filed Apr. 6, 1966, Ser. No. 540,492
Int. Cl. C09b *31/14, 29/36*
U.S. Cl. 260—152                                8 Claims

ABSTRACT OF THE DISCLOSURE

Dyestuffs of the acridone series having the formula

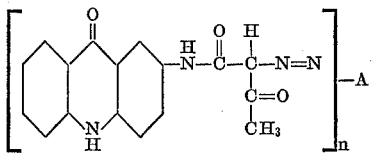

wherein A is an acridone, benzene, or diphenyl radical, or a benzene or diphenyl radical having substituents not imparting water solubility to said dyestuff and selected from the group consisting of lower alkyl, lower alkoxy, chlorine, nitro, nitrilo, carboxylic acid lower alkyl ester, carboxylic acid amide, carboxylic acid lower alkyl amide, carboxylic acid phenyl amide, sulfonic acid amide, sulfonic acid lower alkyl amide, sulfonic acid lower dialkyl amide, lower alkyl sulfone, benzyl sulfone, phenyl sulfone, lower alkyl amino, phenyl amino, acetyl amino, and benzoyl amino, and wherein $n$ is 1 except if A is a diphenyl radical or a substituted diphenyl radical, in which case $n$ is 2.

---

The present invention relates to azo dyestuffs of the acridone series and to methods of making the same.

Red pigments of the acridone series having good fastness properties are known according to U.S. Patent 2,844,484 and U.S. Patent 2,844,485. However, up to the present time, no yellow or orange pigments of the acridone series possessing good fastness properties have been known.

It has now been found that fast yellow to orange pigments of the acridone series, which are represented by the general formula

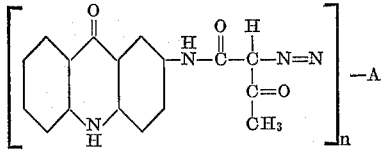

in which $n$ equals 1 or 2 and A represents an acridone radical, or a benzene or diphenyl radical which may be substituted by one or more groups not imparting solubility in water and selected from the group consisting of lower alkyl, lower alkoxy, chlorine, nitro, nitrilo, carboxylic acid lower alkyl ester, carboxylic acid amide, carboxylic acid lower alkyl amide, carboxylic acid phenyl amide, sulfonic acid amide, sulfonic acid lower alkyl amide, sulfonic acid lower dialkyl amide, lower alkyl sulfone, benzyl sulfone, phenyl sulfone, lower alkyl amino, phenyl amino, acetyl amino, and benzoyl amino, can be prepared by coupling diazo compounds on 2-acetoacetylamino-acridone. Monoazo dyestuffs of particular interest are those wherein $n$ is 1 and A is

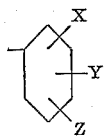

wherein X is hydrogen, lower alkyl, lower alkoxy, chlorine, nitro, nitrilo, carboxylic acid lower alkyl ester, carboxylic acid amide, carboxylic acid lower alkyl amide, carboxylic acid phenyl amide, sulfonic acid amide, sulfonic acid lower alkyl amide, sulfonic acid lower dialkyl amide, lower alkyl sulfone, benzyl sulfone, phenyl sulfone, lower alkyl amino, phenyl amino, acetyl amino, or benzoyl amino, Y is hydrogen, lower alkyl, lower alkoxy, nitro- or chlorine, and Z is hydrogen, chlorine, lower alkyl or lower alkoxy, especially those wherein A is

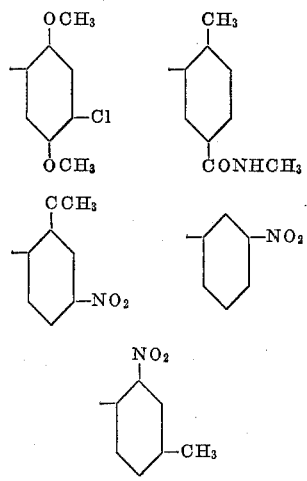

Diazo dyestuffs of particular interest are those wherein $n$ is 2 and A is

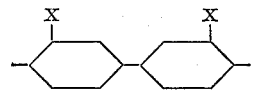

wherein X is hydrogen, lower alkyl, lower alkoxy, nitro, or chlorine. The new pigments have good fastness properties, are non-bleeding, and are especially fast to solvents. They can be used for many purposes, for example to color plastics and resins, or to prepare lakes.

2-acetoacetylamino-acridone, used as coupling component according to the present invention, may be prepared by the reaction of 2-amino-acridone with diketene, more specifically by the reaction of 2-amino-acridone and diketene in an organic solvent such as a lower alcohol like methanol, ethanol, or isopropanol, or in a mixture of said solvents with water at a temperature within the range from 10° C. to 80° C. and at a pH below 8, preferably at room temperature and at a pH from 3 to 7. It may also be prepared by the reaction of 2-amino-acridone with acetoacetic acid esters such as acetoacetic acid methylester or acetoacetic acid ethyl ester, more specifically by the reaction of 2-aminoacridone with said esters in an organic solvent such as chloro-benzene, toluene, or xylene in the presence of an organic base like pyridine or diethyl-aniline at a temperature within the range from 60° to 120° C.

The diazo compounds coupled with 2-acetoacetyl-amino-acridone according to the present invention are prepared from aromatic amines such as amino-acridone and substituted or unsubstituted aniline or diphenyl diamines. The benzene or diphenyl radical A in the formula given earlier herein may, for example, contain one or more lower alkyl groups, such as in o-toluidine, p-toluidine, 1-amino-2,4-dimethylbenzene or 3,3'-dimethyl-4,4'-diamino-diphenyl.

One or more lower alkoxy groups may be present, as in 1-amino-2-methoxy benzene or 3,3'-dimethoxy-4,4'-diaminodiphenyl. Halogen atoms may be present, as in o-, m-, and p-chloro-aniline, 2,5-dichloro-aniline, or 3,3'-dichloro-4,4'-diamino-diphenyl, or the benzene or diphenyl nucleus may contain nitro groups, such as in o-, m-, and p-nitro-aniline or 3,3'-dinitro-4,4'-diaminodiphenyl.

The amine may also be substituted by carboxylic acid ester groups formed from lower alkanols, as in 4-aminobenzoic acid ethyl ester, by nitrile groups, as in 4-aminobenzonitrile, or by carboxylic or sulfonic acid amide groups, such as in 3-amino-benzoic acid amide, 3-aminobenzoic acid anilide, 4-amino-benzoic acid amide, 4-aminobenzoic acid methyl amide, 4-amino-benzoic acid anilide, 4-amino-benzene-sulfonyl methyl amide and dimethylamide. The amine may also contain alkyl or arylamino groups, such as methylamino or phenylamino groups, and alkyl or arylsulfone groups, such as in 2-amino-diphenylsulfone or methyl-(3-aminophenyl)-sulfone.

The aromatic amines which are diazotized and coupled according to the present invention may also contain a combination of substituents, such as are present in 1 - amino-2-methyl-3-chlorobenzene, 1-amino-2-methyl-4-chlorobenzene, 1 - amino - 2 - methyl-5-chlorobenzene, 1-amino - 2 - methyl-4-nitro-benzene, 1-amino-4-methyl-2-nitro-benzene, 1 - amino-2-methoxy-5-chloro-benzene, 3-amino-4-methoxy-benzene-sulfonyl-diethylamine, 1-amino-3 - methyl-4-cyano-6-chlorobenzene, ethyl-3-amino-4-methoxy-phenylsulfone, 1-amino-4-cyano-2,5-dimethoxy-benzene, 1 - amino-2-nitro-4-ethoxy-benzene, 1-amino-2-methoxy - 5 - methyl - 4-benzoyl-amino-benzene, 1-amino-2-nitro-4-acetamino-benzene, or 3-amino-4-methoxy-benzoic acid methylamide.

From these examples it will be clear that the various substituents mentioned do not interfere wtih the coupling reaction when present in the diazo component and give dyes whose properties and utility are as described earlier herein.

The coupling reaction is conveniently carried out by dissolving 2-acetoacetylamino-acridone in aqueous alkali, such as aqueous alkali metal hydroxide like NaOH or KOH, or in a mixture of such an alkali with a lower alkanol like methanol, ethanol, or isopropanol. On acidification of the solution to a pH below about 8, the acetoacetylamino-acridone partially crystallizes, and an aqueous solution of the diazo compound is then added to the resulting mixture. Depending on the stability and coupling energy of the diazo compound, the pH of the reaction mixture during the addition is suitably kept within a range from 1 to 8, preferably from 4 to 7 and the temperature may be between 0° C. and 90° C., preferably from 0° C. to 30° C. Complete addition of the diazo compound usually takes place over 1 to 6 hours.

To maintain the pH of the reaction mixture within the range indicated, it is convenient to precipitate the 2-acetoacetylamino-acridone partially prior to coupling by adding a weak acid such as acetic acid. The resultant solution is then buffered by the presence of salts such as sodium acetate during later addition of the diazo component. Optionally, an anionic, cationic, or non-ionic surfactant may be present in the solution of 2-acetoacetylamino-acridone to facilitate dispersion of the crystallized material, particularly if the aqueous solution is dilute and contains relatively large amounts of water.

The coupling reaction may also be carried out advantageously by buffering an aqueous solution of the diazo compound by the addition of a salt such as sodium acetate and then adding an alkaline solution of 2-acetoacetylamino-acridone, or by adding both the aqueous solution of the diazo compound and the alkaline solution of 2-acetoacetylamino-acridone to a buffer solution such as sodium acetate/acetic acid.

When the coupling reaction is complete, the dyestuff is filtered and washed. In most cases the resulting dyes are soluble to a slight extent in organic solvents and are transformed into their stable non-bleeding pigment modifications by treatment with an organic liquid, suitably over a period of from one-half to 6 hours at a temperature of from 60° C. to 140° C. One part by weight of the dye is conveniently dispersed in from 10 to 200 parts of an organic liquid such as a lower alkanol, an ester formed between a lower alkanoic acid and a lower alkanol, an amide of a lower alkanoic acid, a ketone, a lower alkyl sulfoxide, or an aromatic liquid. Such liquids include methanol, ethanol, isopropanol, butanol, ethyl acetate, butyl acetate, formamide, dimethylformamide, acetone, methyl-ethyl ketone, dimethylsulfoxide, benzene, toluene, pyridine, picoline, nitrobenzene, chlorobenzene, or dichlorobenzene. Liquids boiling in the temperature range indicated earlier are preferred, but a pressure vessel can be used in cases where the boiling point of the liquid is below the desired temperature. If the liquid used in the treatment has a strong dissolving power, as to dimethylformamide and dimethyl-sulfoxide, the formation of a stable modification of the pigment may in some cases be achieved even at room temperature.

The treatment may also be carried out in mixtures of said solvents, or in mixtures of said solvents with water. The latter may form either a solution or a two phase system. In some cases in which the treatment is carried out in the presence of water, it is possible to modify the dyestuffs simply by heating the mixtures obtained in the coupling reaction. Surfactants may optionally be present in the systems in which water is used. In a few cases, simple heating of the original dyestuff in the absence of liquid will promote conversion to the pigment modifications.

In such after-treatment, the original dyestuff undergoes a change in crystal structure. In this sense, the treatment involves or is a recrystallization of the dyestuff, even though extensive solution of the dyestuff in the treating liquid does not occur.

Slight variations in the shade of pigment obtained may be observed when different liquids are used to treat the same dyestuff, probably due to the formation of different crystalline forms.

A better understanding of the present invention and of its many advantages will be had by referring to the following specific examples, given by way of illustration.

EXAMPLE 1

9.38 g. of 1-amino-4-chloro-2,5-dimethoxy-benzene and 25 ml. hydrochloric acid were boiled for approximately one minute. After cooling and the addition of the 180 g. of ice, 3.8 g. of sodium-nitrite were added. The mixture was stirred for 2 hours at −3°C. to 5° C. After clarification, the resulting diazo solution was added in the course of 2 hrs. to a suspension of 2-aceto-acetyl-amino-acridone in methanol. The latter was prepared by dissolving 14.7 g. of acetoacetylamino-acridone in a mixture of 1000 ml. of methanol and 25 ml. of 2 N sodium-hydroxide, followed by the addition of 15 ml. of acetic acid and 16 g. of anhydrous sodium acetate. During the addition of the diazo solution, the temperature of the mixture was kept between 15° C. and 20° C. The pH was kept at 5.8 to 6.2 by gradually adding 20 g. of sodium carbonate.

The resulting brown dyestuff was filtered, washed with methanol and dried. Yield: 24.8 g.

A suspension of the product in a mixture of 2000 ml. of methanol and 200 ml. of dimethylformamide was boiled for 5 hours. The resulting greenish yellow pigment was filtered off, washed with methanol and dried. Yield: 23.5 g.

EXAMPLE 2

A solution of 14.7 g. of 2-acetoacetylaminoacridone in a mixture of 100 ml. of methanol and 6 ml. of a concentrated aqueous solution of sodium hydroxide was added at once to a mixture of 800 ml. water and 10 ml. of acetic acid containing 50 ml. of a polyglycol ether surfactant having an average molecular weight of 400.

A diazo solution prepared from 8.6 g. 2-chloro-4-nitroaniline according to the procedure given in Example 1, was added to the resulting suspension in the course of 1 hour at a temperature of 20° C. and a pH of 5.8 to 6.4, maintained by the gradual addition of 17 g. sodium carbonate. The resulting brown dyestuff was filtered off, washed with water and dried. Yield: 22.3 g.

A suspension of this product in a mixture of 100 ml. of dimethyl-formamide and 200 ml. of butyl acetate was heated for ½ hour to 110° C., cooled to 30° C., filtered off, washed with methanol and dried. 20 g. of a golden orange pigment were obtained.

EXAMPLES 3–22

A number of pigments were prepared in a fashion analogous to that of Examples 1 and 2. The diazo component and pigment tint obtained are given below in Table I. Variations in tint observed when the pigment was recrystallized from different solvents are also noted. In the table, the solvents are identified as follows:

dimethyl formamide+methanol=DMF/Me
dimethyl sulfoxide+methanol=DMS/Me
dimethyl sulfoxide+butyl acetate=DMS/BA
nitrobenzene=NBz
dimethyl formamide=DMF 2. A monoazo dyestuff as in claim 1 wherein $n$ is 1 and A is

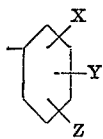

wherein X is hydrogen, lower alkyl, lower alkoxy, chlorine, nitro, nitrilo, carboxylic acid lower alkyl ester, carboxylic acid amide, carboxylic acid lower alkyl amide, carboxylic acid phenyl amide, sulfonic acid amide, sulfonic acid lower alkyl amide, sulfonic acid lower dialkyl amide, lower alkyl sulfone, benzyl sulfone, phenyl sulfone, lower alkyl amino, phenyl amino, acetyl amino, or benzoyl amino, Y is hydrogen, lower alkyl, lower alkoxy, nitro, or chlorine, and Z is hydrogen, chlorine, lower alkyl or lower alkoxy.

3. A diazo dyestuff as in claim 1 wherein $n$ is 2 and A is

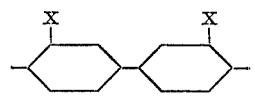

TABLE I

| Ex. No: | Diazo Component | Tint | Solvent |
| --- | --- | --- | --- |
| 3 | Aniline | Greenish yellow | DMF/Me. |
| 4 | p-Toluidine | ___do___ | DMF/Me. |
| 5 | 4,4'-diamino-3,3'-dimethoxy-diphenyl | Golden yellow | DMS/Me. |
| 6 | 2-chloro-aniline | Reddish yellow | DMF/Me. |
| 7 | 2,5-dichloro-aniline | Golden orange | DMS/BA. |
| 8 | 3,3'-dichloro-4,4'-diamino-diphenyl | Yellowish brown | DMS/Me. |
| 9 | 2-nitro-aniline | Brown | DMF/Me. |
| 10 | 3-nitro-aniline | Yellow | DMF/Me. |
|  | ___do___ | Orange | NBz. |
| 11 | 4-amino-acetanilide | Greenish yellow | DMF/Me. |
| 12 | 2-methyl-5-nitro-aniline | Reddish yellow | DMF/Me. |
| 13 | 4-methyl-2-nitro-aniline | Orange | DMF/Me. |
| 14 |  | ___do___ | DMF/Me. |
| 15 | 2-methoxy-4-nitro-aniline | Greenish yellow | DMF/Me. |
|  | 2-methoxy-5-nitro-aniline | Golden yellow | NBz. |
|  | ___do___ |  |  |
| 16 | 4-methoxy-2-nitro-aniline | Brown | DMF/Me. |
| 17 | 4-chloro-2-nitro-aniline | ___do___ | DMF. |
| 18 | 2-amino-acridone | Yellow | DMF. |
| 19 | 2-chloro-4-benzoylamino-5-methoxy-aniline | Reddish brown | DMF/Me. |
| 20 | 3-amino-4-methyl-benzenesulfonyl-dimethylamide | Yellow | DMS/Me. |
| 21 | Benzyl-3-amino-4-methoxy-phenyl-sulfone | ___do___ | DMF/Me. |
| 22 | 3-amino-4-methoxy-benzoic acid amide | ___do___ | DMF. |
| 23 | 3-amino-4-methyl-benzoic acid monomethyl amide | Greenish yellow | (¹) |

¹ Changes to reddish yellow on simple heating at 150° C.

What is claimed is:
1. Dyestuffs of the acridone series having the formula

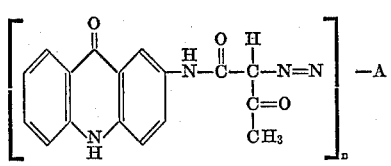

wherein A is an acridone, benzene, or diphenyl radical, or a benzene radical having up to three substituents, or a diphenyl radical having up to two substituents, said substituents not imparting water solubility to said dyestuff and being selected from the group consisting of lower alkyl, lower alkoxy, chlorine, nitro, nitrilo, carboxylic acid lower alkyl ester, carboxylic acid amide, carboxylic acid lower alkyl amide, carboxylic acid phenyl amide, sulfonic acid amide, sulfonic acid lower alkyl amide, sulfonic acid lower dialkyl amide, lower alkyl sulfone, benzyl sulfone, phenyl sulfone, lower alkyl amino, phenyl amino, acetyl amino, and benzoyl amino, and wherein $n$ is 1 except if A is a diphenyl radical or a substituted diphenyl radical, in which case $n$ is 2.

wherein X is hydrogen, lower alkyl, lower alkoxy, nitro, or chlorine.

4. A monoazo dyestuff as in claim 1 wherein A is

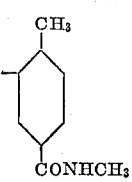

5. A monoazo dyestuff as in claim 1 wherein A is

6. A monoazo dyestuff as in claim 1 wherein A is

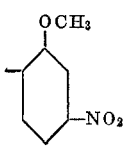

7. A monoazo dyestuff as in claim 1 wherein A is
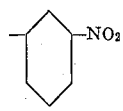
8. A monoazo dyestuff as in claim 1 wherein A is
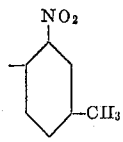
References Cited
UNITED STATES PATENTS
| 3,032,546 | 5/1962 | Johnson | 260—193 |
| 3,124,565 | 3/1964 | Schilling et al. | 260—157 |
| 3,137,686 | 6/1964 | Dietz et al. | 260—157 |
CHARLES B. PARKER, Primary Examiner
D. M. PAPUGA, Assistant Examiner
U.S. Cl. X.R.
106—288; 260—37